UNITED STATES PATENT OFFICE

ALFRED BERGDOLT, OF VOHWINKEL, NEAR ELBERFELD, AND WILHELM NEELMEIER AND THEODOR NOCKEN, OF LEVERKUSEN-ON-THE-RHINE, GERMANY, ASSIGNORS TO GENERAL ANILINE WORKS, INC., OF NEW YORK, N. Y., A CORPORATION OF DELAWARE

MANUFACTURE OF NEW SULPHUR DYESTUFFS

No Drawing. Application filed August 13, 1927, Serial No. 212,840, and in Germany August 20, 1926.

The present invention relates to new sulphur dyestuffs which are obtainable by melting with a polysulfide in the presence of a copper salt a compound of the general formula:

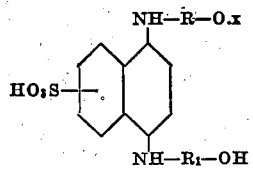

wherein R and $R_1$ represent aryl nuclei and $x$ represents an alkyl group and to a process of preparing the same.

We have found that bluish-black to green-black sulphur dyestuffs of particularly good fastness to light and clearness of shade are obtained, when the compounds of the above general formula, which are obtainable by the mutual oxydation of para-aminophenols and ethers of para-oxy-aryl-1-naphthylamino-6-7- or 8-mono sulfonic acid, are melted together with polysulfides with the addition of copper salts.

The dyestuffs thus obtained represent bluish-black to green-black powders which are insoluble in water and organic solvents but soluble in concentrated sulfuric acid with a green to bluish-green color. They yield with sodium sulfide green colored vats and dye cotton greenish shades.

The following examples will illustrate the present invention:—

*Example 1.*—31.6 kg. of 1-para-anisyl-amino-4-para-hydro-oxyphenyl-aminonaphthalene-8-sulfonic acid, obtainable by oxidation of para-anisyl-1-naphthylamine-8-sulfonic acid and para-aminophenol and subsequent reduction to the leuco indophenol and having the probable formula:

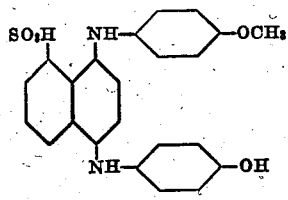

are heated under reflux in the presence of 125 litres of alcohol, 25 kg. of sodium sulfide (100%) 32 kg. sulphur and 5 kg. of copper sulfate for 60 hours, when the melt is complete. For isolation of the dyestuff the alcohol is distilled off, the dyestuff is taken up with water and separated in the customary manner, advantageously by passing air through the solution.

The dyestuff thus obtained is a bluish black powder insoluble in water and organic solvents but soluble in concentrated sulphuric acid with a greenish-blue color and in diluted sodium sulfide solution with a bluish-green color.

The dyestuff dyes cotton from a bath containing sodium sulfide a clear, extraordinarily yellow tinged green shade.

*Example 2.*—32.6 kg. of 1-para-phenethyl-amino-4-para-hydroxy-phenylamino-naphthalene-8-sulfonic acid, obtainable by oxidation of para-phenetyl-1-naphthylamine-8-sulfonic acid and para-aminophenol and subsequent reduction to the leuco indophenol and having the probable formula:

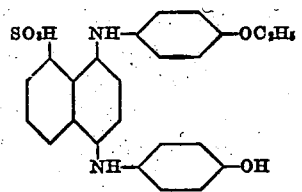

are melted together and worked up as described in Example 1.

This dyestuff is identical in every respect as regards tinctorial properties with the dyestuff described in Example 1.

*Example 3.*—31.6 kg. of 1-para-anisyl-amino-4-para-hydroxy-phenylamino-naphthalene-6- or 7-sulfonic acid, obtainable by oxidation of para-anisyl-1-naphthylamine-6- or 7-sulfonic acid and para-aminophenol and subsequent reduction to the leuco indophenol and having, if para-anisyl-1-naphthylamine- 6-sulfonic acid is used as starting material, probably the formula:

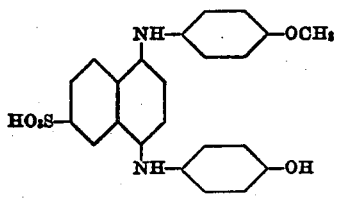

and if the product is derived from para-anisyl-1-naphthylamine-7-sulfonic acid, probably the formula:

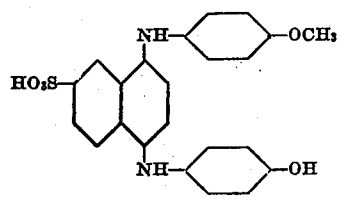

are melted together and worked up as described in Example 1.

The dyestuff dyes cotton pure bluish-green shades.

We claim:—

1. The process which consists in melting with a polysulfide in the presence of a copper salt a compound of the general formula:

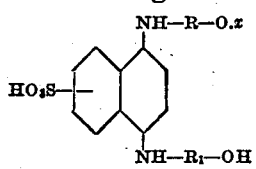

wherein R and $R_1$ represent aryl nuclei and $x$ represents an alkyl group.

2. The process which consists in melting with a polysulfide in the presence of a copper salt a compound of the general formula:

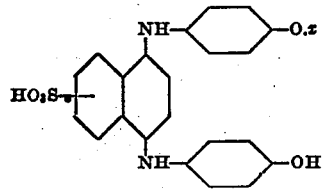

wherein $x$ represents an alkyl group.

3. The process which consists in melting with sodium polysulfide in the presence of copper sulfate the compound of the probable formula:

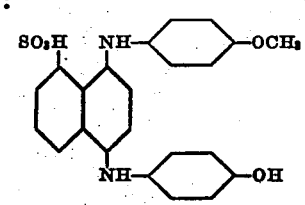

4. As new products the sulphur dyestuffs which are obtainable by melting with a polysulfide in the presence of a copper salt a compound of the general formula:

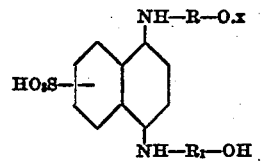

wherein R and $R_1$ represent aryl nuclei and $x$ represents an alkyl group, which dyestuffs are in the dry state bluish-black to green-black powders, are insoluble in water and organic solvents, soluble in concentrated sulphuric acid with a green to bluish-green color, yield a green colored vat in sodium sulfide and dye cotton greenish shades.

5. As new products the sulphur dyestuffs which are obtainable by melting with a polysulfide in the presence of a copper salt a compound of the general formula:

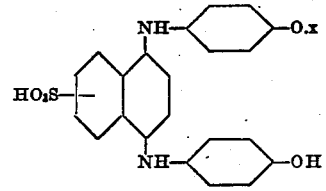

wherein $x$ represents an alkyl group, which dyestuffs are in the dry state bluish-black to green-black powders, are insoluble in water and organic solvents, soluble in concentrated sulphuric acid with a green to bluish-green color, yield a green colored vat in sodium sulfide and dye cotton greenish shades.

6. As a new product the sulphur dyestuff which is obtainable by melting with sodium polysulfide in the presence of copper sulfate the compound of the probable formula:

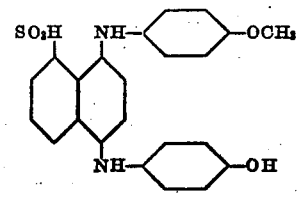

which is in the dry state a bluish-black powder insoluble in water and organic solvents, is soluble in sulphuric acid with a greenish-blue color, yields a clear yellow tinged green shade on cotton from a vat containing sodium sulfide.

In testimony whereof we have hereunto set our hands.

ALFRED BERGDOLT.
WILHELM NEELMEIER.
THEODOR NOCKEN.